United States Patent Office 3,810,876
Patented May 14, 1974

3,810,876
PROCESS OF INCREASING THE MOLECULAR WEIGHT OF MOLTEN POLYAMIDES WITH DIARYL ESTERS
Clifton Douglas Cowell and John Richardson Wright, Pontypool, England, assignors to Imperial Chemical Industries Limited, London, England
No Drawing. Continuation of abandoned application Ser. No. 868,057, Oct. 21, 1969. This application Feb. 4, 1972, Ser. No. 223,742
Int. Cl. C08g 20/38
U.S. Cl. 260—78 SC  11 Claims

ABSTRACT OF THE DISCLOSURE

A process for increasing the chain length and hence the viscosity of synthetic linear polyamides, whilst preserving the linearity by means of addition of a defined class of diaryl esters. Also included in the invention are the polymers with increased viscosity and shaped products made therefrom.

---

The present invention which is a continuation of application Ser. No. 868,057, filed Oct. 21, 1969, now abandoned, relates to the preparation of improved synthetic linear polyamides, including copolyamides, particularly those made from polymerization of dibasic acids and diamines, and more particularly nylon 66. It includes shaped products such as fibres, yarns, films and the like prepared from such improved polymers.

The invention will now be particularly described, in no way limitatively, with reference to the making of improved polymers for melt-spinning into the industrial and textile fibres.

For a number of industrial products, such as for instance tire cord, synthetic linear polyamides having a high relative viscosity (designated hereinafter by R.V.) are required. In general, the higher the R.V. of a polyamide the higher the strength or tenacity of the products prepared from it and such high strength is of great importance in tire cords, for example.

A high R.V. polymer can also be of great importance in the spinning of textile filaments of non-circular cross-section, where a low R.V. polymer tends to lose its shape after leaving the spinneret.

When the polymers are to be melt spun into, for instance, filaments, it is important that the high R.V. should not be attained by cross-linking, which tends to give a three-dimensional gelled, non-processable product, but should be attained substantially by extension of polymer chain length, so retaining the linear characteristics of the polymer. Such necessity for linearity of the high R.V. polymers for fibre production can be contrasted with the requirement of a high R.V. polymer destined to be used for moulding purposes where cross linking may be desirable.

Many attempts have been made to prepare high R.V. linear polymers which can be spun and drawn to make high strength yarns, but it has been found very difficult to preserve polymer linearity.

Applicants have found a class of compounds which are esters, as hereinafter defined, which when added in suitable amounts and under suitable conditions to a polyamide increases the R.V. of said polyamide, substantially by increasing chain length and not by cross-linking, so affording a high R.V. polymer which may be melt spun and drawn to produce products, such as tire cords, with improved strength.

Chain linking can occur via either amine groups or carboxyl groups, situated at the ends of polymer chains. The compounds of the present invention combine preferentially with free amine ends, so eliminating them. The resulting low level of amine end groups in the finally prepared polymers confers a surprising improvement in heat resistance on said polymers and on the products made therefrom. Such improved heat resistance is particularly valuable in tire cords since, during the processing which leads to their being incorporated into a tire, they are frequently subjected to high temperatures, which may degrade them.

Since said compounds react preferentially with the amine ends, the concentration of amine ends in the prepared polyamide, prior to addition of the said compounds, will have a considerable effect on the R.V. rise attained, as will, of course, the proportion of the compound added to the polyamide. If necessary, the amine end content of the polyamide prior to addition of said compounds may be increased by addition of excess diamine to the original polymer-forming monomer mixture.

The use of the compounds of the present invention provides a further advantage in that when they react with the molten polyamide substantially no undesirable by-products are formed. There is little or no bubble formation, such as is frequently met with when using, for instance, carbonate or polycarbonate additives with polyamides. Such bubble formation naturally gives rise to considerable difficulties in spinning and, if excessive, can lead to a drawn product having poor strength.

A certain amount of water is present in polymer prepared by polycondensation, even when the reaction is carried out in an inert-gas atmosphere, such as nitrogen. If amine or acid chain linking agents instead of esters are added to polymers so prepared, further water is produced by the linking reaction. Such water tends to hydrolyze the polymer if said polymer is held at high temperatures, polycondensation being a substantially reversible reaction, and so to reduce its molecular weight and R.V.

It is clear therefore, that during preparation of high R.V. polyamides according to the process of the present invention, if water, from any source, is present two conflicting reactions occur: chain linking, tending to increase the R.V. and hydrolysis tending to lower the R.V. Applicants have found that because of these conflicting processes there is an optimum point in time, from the moment when the compounds of the present invention are added, where the R.V. reaches a maximum and beyond which point the R.V. starts to fall.

The finding of this optimum point becomes very critical when the spinning process is carried out under steam, as is commonly practiced. Alleviation of the problem of hydrolysis and consequent R.V. decrease is attained by the use of esters, which do not produce hydrolyzing water as a reaction by-product and such esters favor the movement of the reaction towards high R.V. If the presence of an optimum point, as aforesaid, is not appreciated the attainment of the optimum high R.V. by the use of the present invention can, in practice, easily be missed, especially in the presence of steam, that is, in the presence of a large amount of water. For instance, the time to reach the maximum value when nylon 66 polymer is held at 290° C. under steam is only about two minutes after the addition of the esters to the previously prepared polyamide.

In practice the time for reaching the optimum R.V. varies according to process conditions, the type of polymer and the type of additive etc. However, the knowledge that such an optimum time exists is of great value, since such knowledge leads the practicer of the present invention to search for it by simple experimentation and thence to develop optimum process conditions.

From what has been said it will be seen that the compounds added to prepared polyamides for producing an increase in R.V. while preserving the linear nature of such polymers should be adequately stable to pyrolysis, react sufficiently rapidly and substantially with the amine end groups only and favor polymerization rather than hydrolysis.

A class of compounds which has been found by extensive experimentation to fulfill the aforesaid stipulations is defined as: diaryl esters, preferably diphenyl esters or polyaryl esters, of dibasic acids with a carbon number of 5 to 36. Said dibasic acids may be aliphatic, cyclo-aliphatic, aromatic or heterocyclic acids and may optionally contain ether-linked oxygen or sulphur or tertiary nitrogen atoms or keto or amide groups as part of their structure. Specifically excluded from the above class are all dicarboxylic acids with:

(1) The carboxyl groups situated on neighboring or vicinal carbon atoms.

(2) Carboxyl groups occuping the peri-positions of structures containing the naphthalene nucleus.

(3) Gem dicarboxyl groups except when the latter are attached to a fully alkylated carbon atom i.e. the grouping shown is excluded except when $a$ and $b$ are both saturated aliphatic groups or form part of a saturated alicyclic structure.

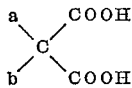

As examples of dibasic acids further to those quoted in Tables 1, 4 and 6 one may cite:

Pimelic acid
Suberic acid
Hexadecane 1,16 dicarboxylic acid
2 methylbutane 1:4 dicarboxylic acid
2 ethyl 3 methylbutane 1:4 dicarboxylic acid
1 ethylbutane 1:4 dicarboxylic acid
Propane 2:2 dicarboxylic acid
Butane 2:2 dicarboxylic acid
Cyclopentane 1:1 dicarboxylic acid
Hexahydroiso or terephthalic acid
Hexahydrohomophthalic acid
Hexahydrohomoiso or terephthalic acid
3 carboxy-1 cyclopentylacetic acid
3 carboxy 2:2 dimethylcyclobutylacetic acid
2,5-dimethylterephthalic acid
5 tertbuylisophthalic acid
Naphthalene 1:4 dicarboxylic acid
Naphthalene 2:7 dicarboxylic acid
Naphthalene 1:5 diacetic acid
Benzophenone 2:4' dicarboxylic acid
3-(ortho or meta or para carboxyphenyl) propionic acid
9,10 di($\beta$-carboxyethyl) anthracene
2,3,5,6 tetra-methyl-p-phenylene-di-$\beta$-propionic acid
2,5 dimethyl-p-phenylenediacetic acid
Di-ortho, meta or para(carboxymethoxy)benzene
2:2 di (p-(carboxymethoxy) phenyl) propane
$\beta$-(p-(Carboxymethyl) phenyl) propionic acid
Di (p-(carboxymethyl) phenyl) ether
Di (p-(carboxymethoxy) phenyl) ether
1:7 di (carboxymethoxy) naphthalene
5 carboxy-4-thiazolylacetic acid
5 carboxybenziminazole-2-pelargonic acid
Furan-2:5 dicarboxylic acid
Furan-2:5 di-$\beta$-propionic acid
5 carboxy-2 furan-$\beta$-propionic acid
Tetra hydro furan-2:5 dicarboxylic acid
2:6 di(carboxymethyl)-pyridine.

Said aryl esters may be obtained from mono or dihydric phenols or naphthols or the bis-condensation products of monohydric phenols or naphthols with carbonyl compounds; all such phenolic structures may optionally carry additional alkyl, cycloalkyl or aryl substituents. As examples of aryl esters further to those quoted in Table 3 hereinafter, one may cite the adipates from 2 or 4 mono-, or 2,4 di-, ethyl, isopropyl, cyclohexyl or α-methyl-cyclohexyl phenol.

Dihydric phenols are illustrated by the examples of polyaryl esters in Table 5 hereinafter.

An example of the condensation product of a carbonyl compound with phenol is 4,4' isopropylidene diphenol. Polyaryl esters of this compound are illustrated in Examples 45 to 48 of Table 5. As further examples of carbonyl compounds one may cite formaldehyde, normal or iso butyraldehyde or cyclohexanone, which will phenol give respectively 4,4' methylene, 4,4' normal or iso butylidene, and cyclo hexylidene diphenol.

In addition to resorcinol, shown as Example 49 hereinafter one may cite for example, quinol, 2,7 dihydroxy-naphthalene and 4,4' dihydroxy diphenyl.

Accordingly the present invention, in one of its aspects, provides a process for the production of a synthetic linear melt-spinnable polyamide or co-polyamide having increased relative viscosity which process comprises the incorporation into a synthetic linear polyamide or copolyamide in the molten state of at least one diaryl or polyaryl ester of a dicarboxylic acid with a carbon number of 5 to 36 and having the carboxyl groups attached either to a single carbon atom, provided the other bonds of said carbon atom are connected to saturated aliphatic groups or form part of a saturated alicyclic structure, or attached to separate carbon atoms other than vicinal- or peri-positioned carbon atoms.

A further aspect of the present invention provides synthetic linear melt-spinnable polyamides having increased relative viscosity, obtained by the aforesaid method.

The ester is preferably added in an amount which is substantially stoichiometrically equivalent to the free polymer amine end groups. However, in practice the amount added should be such, either above or below the stoichiometric equivalent as to accomplish the objects of the invention while keeping undesirable effects at a minimum. The addition may be made, for instance, to the polymer in a polymerizing autoclave, preferably at extrusion from said autoclave, or the ester may be coated onto polymer chip prior to melting and spinning or other shaping process or a concentrate of ester and polyamide or copolyamide, called a master batch, may be made and added to the main polymer batch either in the autoclave or prior to spinning or other shaping process or the ester may be pelletized with the use of an inert binder and the pellets subsequently blended with polymer chips. Alternatively the compound may be added, either alone or in admixture, to the polymer melt just prior to spinning or other shaping process, for instance in a continuous polymerization process. Other methods of addition may be devised to meet particular requirements. Other additives may be present in the polymer, such as pigments stabilizers and the like, so long as these do not vitiate objects of the invention. Of course, if found desirable, a mixture of two or more esters of the present invention may be used.

The present invention is illustrated but not limited by the following examples.

Characteristics mentioned in the examples are defined and measured as follows:

(1) Relative viscosity (R.V.).—The relative viscosity of a polyamide is defined as the ratio of the viscosity of a solution of given strength of the polyamide in a given solvent to the viscosity of the solvent itself at the same prescribed temperature. In the case of the relative viscosity values quoted in this specification the solvent employed was a 90% by weight (solute:solution) aqueous solution of formic acid. The viscosity of an 8.4% by weight (solute:solution) solution of the polyamide in the above mentioned solvent was determined and the ratio of said viscosity to the viscosity of the solvent itself evaluated. The temperature employed for the determination of viscosities was 25° C.

(2) Heat strength retention (H.S.R.).—A suitable length of the yarn was heated in air in an oven at 225° C. for 30 mins. Its tenacity was then measured and expressed as a percentage of the tenacity of the yarn before heating.

Other characteristics are measured by the conventional methods (tenacity is measured on an Instron instrument). The terms A.E.G. and C.E.G. in the following examples denote micro-equivalents of amine or carboxyl groups respectively, per gram of polymer (or equivalents per $10^6$ grams of polymer).

The inherent viscosity (abbreviated I.V. in the tables) of a polyamide is defined herein as twice the natural logarithm of the quotient of the viscosity at 25° C. of a solution of a 0.5 percent weight by volume of the polyamide dissolved in the appropriate solvent divided by the viscosity of the said solvent at the same temperature. The viscosity measurements are carried out in an Ostwald type viscometer.

The solvent used was 90% aqueous phenol in all cases except Examples 66 and 70, where the solvent was m-cresol and Example 73 where the solvent was dichloroacetic acid.

EXAMPLES 1-18

To samples of nylon 66 having various amine end contents and various R.V.'s various dibasic esters were added and the mixtures stirred under nitrogen, at 285° C. for various times.

At the end of the given time the molten polymer was allowed to cool to room temperature and the solid polymer mass then broken up. The R.V.'s, C.E.G's and A.E.G's of these polymers were measured in the usual manner. The results obtained are shown in Table 1.

It can be seen that in all cases where esters falling within the scope of the invention were used, i.e. Examples 1-9 inclusive, Example 12 and Examples 14-18 inclusive, the free amine groups of the polymers were greatly reduced.

It can also be seen in Examples 1-4 that the polymer R.V. increased as the concentration of ester in the polymer was increased to that which is the stoichiometric equivalent for the amine ends of the polymer. Furthermore, Examples 14-18 show that if the concentration of ester is increased to values which are substantially in excess of that which is the stoichiometric equivalent for the amine ends of the polymer, there is a tendency to a progressive lowering of the final polymer R.V. The percentage excess in Examples 14-18 refers to the excess of ester over the stoichiometric equivalent for the amine ends of the polymer. The results illustrate that there is an optimum concentration of additive for obtaining maximum polymer R.V.

By contrast, Example 13 shows that diphenyl oxalate (carbon number 2) is ineffective for the practice of the invention owing to decomposition at the operating temperature. Examples 10 and 11 show the ineffectiveness of the aliphatic esters in that no practically useful increase in the polymer R.V. is obtained.

EXAMPLES 19-26

A further series of experiments were carried out, similar to those of Examples 1-18, but in this case the polymers obtained were melt-spun and drawn to produce textile yarns. The results obtained are shown in Table 2.

The value $TE^{1/2}$ shown in Table 2 is a practically convenient parameter for indicating yarn quality. It can be seen that the value of $TE^{1/2}$ tends to fall after the amount of ester exceeds the stoichiometric equivalent.

TABLE 1.—6.6 NYLON—ANALYSES OF POLYMERS STIRRED AT 285° C. WITH ESTERS

| Ex. | R.V. of original 6.6 polymer | Ester | Amount Wt. percent | Equiv. per $10^6$ g. | Stirring time at 285° C. in mins. | Analysis R.V. | A.E.G. | C.E.G. |
|---|---|---|---|---|---|---|---|---|
| 1 | 25 | Nil | | | | 25 | 160 | 23 |
| 2 | 25 | Diphenyl ester of decamethylene dicarboxylic acid | 1.6 | 80 | 15 | 77 | 83 | 22 |
| 3 | 25 | ....do... | 2.4 | 120 | 15 | 160 | 49 | 24 |
| 4 | 25 | ....do... | 3.0 | 160 | ¹5 | 237 | 30 | 33 |
| 5 | 35 | Nil | | | | 35 | 107 | 40 |
| 6 | 35 | Diphenyl ester of decamethylene dicarboxylic acid | 2 | 107 | 15 | 116 | 28 | 36 |
| 7 | 35 | Diphenyl sebacate | 1.9 | 107 | 15 | 171 | 12 | 43 |
| 8 | 35 | Diphenyl terephthalate | 1.7 | 107 | 15 | 125 | 17 | 50 |
| 9 | 35 | Diphenyl isophthalate | 1.7 | 107 | 15 | 112 | 12 | 61 |
| 10 | 35 | Dimethyl terephthalate | 1.1 | 107 | 15 | 40 | 61 | 60 |
| 11 | 35 | Dimethyl isophthalate | 1.1 | 107 | 15 | 40 | 57 | 72 |
| 12 | 35 | Diphenyl adipate | 1.6 | 107 | 15 | 162 | 18 | 40 |
| 13 | 35 | ....do... | 1.3 | 107 | 15 | Decomposed | | |
| 14 | 44 | Nil | | | | 44 | 51 | 69 |
| 15 | 44 | Diphenyl adipate | 0.79 | 51 | 5 / 15 | 64 / 64 | 17 / 17 | 71 / 79 |
| 16 | 44 | ....do... | 0.89 | ²57 | 5 / 15 | 64 / 68 | 14 / 15 | 79 / 79 |
| 17 | 44 | ....do... | 1.0 | ³64 | 5 / 15 | 54 / 57 | 15 / 15 | 88 / 85 |
| 18 | 44 | ....do... | 1.17 | ⁴76 | 5 / 15 | 49 / 53 | 13 / 13 | 94 / 85 |

¹ Too viscous to stir.
² 12.5% excess.
³ 25% excess.
⁴ 50% excess.

TABLE 2

| Example number: | Polymer, A.E.G. | Quantity of diphenyl adipate (equiv. per $10^6$ g.) | Yarn properties R.V. | Ten. (T) (g./d.) | Ext. E (percent) | $TE^{1/2}$ | A.E.G. | C.E.G |
|---|---|---|---|---|---|---|---|---|
| 19 | 50 | 0 | 48 | 8.4 | 14 | 31.5 | 51 | 71 |
| 20 | 50 | 20 | 47 | | | | 42 | 73 |
| 21 | 50 | 50 | 63 | 9.3 | 13.4 | 34.2 | 21 | 78 |
| 22 | 50 | 60 | 66 | 9.3 | 12.9 | 33.6 | 14 | 81 |
| 23 | 63 | 0 | 47 | 8.3 | 15.9 | 32.8 | 64 | 61 |
| 24 | 63 | 70 | 80 | 9.3 | 13.9 | 34.5 | 19 | 68 |
| 25 | 63 | 80 | 80 | 9.3 | 13.4 | 34.0 | 13 | 75 |
| 26 | 63 | 105 | 55 | 8.0 | 15.4 | 31.3 | 5 | 86 |

EXAMPLES 27 AND 28

Example 27.—The polymer used in this example, which illustrates the preparation of high tenacity industrial yarn, had the following properties and contained the following additives:

A.E.G.—51   C.E.G.—68   R.V.—46

Cu—60 p.p.m. as cupric acetate, B—22 p.p.m. as NaBO$_2$, I—600 p.p.m. as potassium iodide.

This polymer was coated by tumbling in a Gardner mixer with 0.74% w./w. of a fine crystalline powder of diphenyl adipate, calculated to give equivalent quantities of phenyl ester and amine ends. The coated polymer was then spun under steam at 35 lb./hr. via a melt-pool feeding two filter-packs and spinnerets, at 956 f.p.m. (feet per minute) to produce 4100 denier 140 filament yarn. The resultant undrawn yarn was then drawn at 1100 f.p.m. at a ratio of 5.4 on a drawtwister. The resultant yarn had the following properties.

|  | Yarn containing ester additive | Control yarn |
|---|---|---|
| R.V. | 63 | 47 |
| A.E.G. | 21 | 51 |
| C.E.G. | 78 | 68 |
| Yarn tenacity (T), g.p.d. | 9.3 | 8.3 |
| Yarn extensibility (E), percent | 13.4 | 13.6 |
| TE$^{1/2}$ | 34.2 | 30.7 |
| H.S.R. | 93 | 88 |

With one pack not spinning i.e. at half throughput, the polymer-ester mixture remaining at high temperature for roughly twice the time, the R.V. fell to 54, indicating the large rate dependence of this reaction.

Example 28.—A modified polymer was used; it was normal except that extra hexamethylene diamine was added to a larger production autoclave to give the following properties:

A.E.G.—67   C.E.G.—50   R.V.—45

This polymer was then made into chips and chip coated with diphenyl adipate at 1.03% w./w., which was in stoichiometric equivalence with the free polymer amine ends. The chip coated polymer was then spun and drawn as in Example 27 above to give yarn with the following properties:

|  | Yarn containing ester additive | Control yarn |
|---|---|---|
| R.V. | 77 | 48 |
| A.E.G. | 16 | 64 |
| C.E.G. | 74 | 57 |
| Yarn tenacity (T) | 10.2 | 8.4 |
| Extensibility at max. load (percent) | 12.4 | 14.0 |
| TE$^{1/2}$ | 35.9 | 31.4 |

Again, the R.V. fell to 64 when only one pack was used for spinning i.e. when the reaction time was increased.

EXAMPLES 29–36

Further examples of the R.V. rise which may be obtained using compounds of the present invention based on adipic acid are illustrated in Table 3 below.

Nylon 66 polymer was stirred for 15 minutes at 285° C., with a diaryl ester of adipic acid. The amount of the compound added, the final R.V. of the polymer, as well as its amine and carboxyl equivalent groups are shown in Table 3. The results obtained with no compound added to the polymer are shown for comparison in unnumbered examples.

TABLE 3

66 Nylon—analysis of polymer stirred for 15 mins. at 285° C. with diaryl esters

| | Diaryl esters of adipic acid— | Amount | | Analysis | | |
|---|---|---|---|---|---|---|
| Example | Ester | Wt. percent | Equiv. per 10$^6$ g. | R.V. | A.E.G. | C.E.G. |
| | None | | | 35 | 107 | 40 |
| 29 | Di p-tert butyl phenyl adipate | 2.2 | 107 | 204 | 12 | 39 |
| 30 | Di p-tert octyl phenyl adipate | 2.8 | 107 | 185 | 11 | 42 |
| 31 | Di p-phenyl phenyl adipate | 2.4 | 107 | 137 | 17 | 46 |
| 32 | Di p-nonyl phenyl adipate (mixed isomers) | 3.0 | 107 | 120 | 31 | 55 |
| 33 | Di 2:6 xylenyl adipate | 1.9 | 107 | 185 | 12 | 37 |
| 34 | Di 2:4 tert butyl phenyl adipate | 2.8 | 107 | 175 | 14 | 34 |
| 35 | Di cresyl adipate (mixed isomers) | 1.8 | 107 | 132 | 15 | 58 |
| 36 | Di α naphthyl adipate | 2.1 | 107 | 105 | 21 | 55 |

EXAMPLES 37–44

The procedure of Examples 29–36 was repeated, but using in this case diphenyl esters of other dicarboxylic acids.

The results obtained are shown in Table 4. Example 37 shows the unsuitability of a diaryl ester of a dicarboxylic acid with vicinal carboxyl groups.

TABLE 4

66 nylon—analysis of polymer stirred for 15 mins. at 285° C. with diaryl esters

| | Diaryl esters of adipic acid— | Amount | | Analysis | | |
|---|---|---|---|---|---|---|
| Example | Ester | Wt. percent | Equiv. per 10$^6$ g. | R.V. | A.E.G. | C.E.G. |
| | None | | | [1] 35 | 107 | 40 |
| 37 | Diphenyl succinate | 1.4 | 107 | 47 | 42 | 32 |
| 38 | Diphenyl glutarate | 1.5 | 107 | 61 | 46 | 39 |
| 39 | Diphenyl azelate | 1.8 | 107 | 173 | 15 | 34 |
| 40 | Diphenyl ester of C$_{36}$ di-acid (Empol Dimer Acid Ex Unilever—Emery N. V. Holland) a trade name. | 3.88 | 107 | ([2]) | 19 | 55 |
| 41 | Diphenyl 9,9 fluorene dipropionate | 2.5 | 107 | 129 | 17 | 46 |
| 42 | Diphenyl ester of 1,1,3 trimethyl-3-p-carboxy phenyl-5-carboxy indane. | 2.5 | 107 | 191 | 11 | 42 |
| 43 | Diphenyl cyclohexane 1,3 dicarboxylate (cis isomer). | 1.7 | 107 | 70 | 31 | 45 |
| 44 | Diphenyl cyclohexane 1,4 dicarboxylate— | | | | | |
| | Mainly cis isomer | 1.7 | 107 | 87 | 24 | 36 |
| | Mainly trans isomer | 1.7 | 107 | 133 | 13 | 31 |

[1] I.V. 0.80.
[2] I.V. 1.17.

EXAMPLES 45–61

These examples illustrate the results from the addition of other esters of the present invention. Said results are given in Tables 5–7 below.

TABLE 5

66 nylon—analysis polymers stirred at 285° C. with polyaryl esters

| Example | Polyaryl ester Name | I.V. | Vicat softening point | Amount Wt. percent | Equiv. per $10^5$ g. | Analysis R.V. | A.E.G. | C.E.G. |
|---|---|---|---|---|---|---|---|---|
| | None | | | | | 35 | 107 | 40 |
| 45 | Poly[2,2 propanebis(4 phenyl adipate)] | 0.02 | 65 | 1.8 | 107 | 203 | 13 | 38 |
| 46 | Poly[2,2 propanebis(4 phenyl azelate)] | 0.2 | (1) | 2 | 107 | 280 | 8 | 34 |
| 45 | Poly[2,2 propane bis (4-phenyl iso-phthalate co-terephthalate 50/50)] | 0.25 | 193 | 2 | 107 | 141 | 15 | 39 |
| 48 | Poly[2,2 propane bis (4-phenyl iso-phthalate co-terephthalate 75/25)] | 0.25 | 263 | 1.3 | 70 | 102 | 58 | 28 |
| 49 | Poly[1,3 phenylene isophthalate coterephthalate (50/50)] | 0.23 | 156 | 1.3 | 107 | 206 | 11 | 40 |

[1] Softens at room temperature.

TABLE 6

66 nylon—analysis of polymers stirred at 285° C. with diaryl esters from dicarboxylic acids containing ether, tertiary nitrogen, keto and thio groups

| Example | Diphenyl ester | Amount Wt. percent | Equiv. per $10^5$ g. | Analysis R.V. | A.E.G. | C.E.G. |
|---|---|---|---|---|---|---|
| | None | | | 35 | 107 | 40 |
| 50 | Diphenyl diglycollate | 1.5 | 107 | 88 | 23 | 23 |
| 51 | Diphenyl oxydibutyrate | 1.8 | 107 | 81 | 34 | |
| 52 | Diphenyl ester of 1:4 bis [p-(beta carboxy ethyl) phenoxy] butane. | 2.9 | 107 | 103 | 24 | 53 46 |
| 53 [1] | Diphenyl ester of NN di(3-carboxy-n-propyl)piperazine. | 2.2 | 107 | 78 | 114 | 19 |
| 54 | Diphenyl pyridine 2,6 dicarboxylate | 1.7 | 107 | 86 | 36 | 27 |
| 55 | Diphenyl pyridine 2,5 dicarboxylate | 1.7 | 107 | 70 | 38 | 38 |
| 56 | Diphenyl ester of NN di keto piperazine diacetic acid. | 2.0 | 107 | 78 | 36 | 57 |
| 57 | Diphenyl ester of gamma keto pimelic acid | 1.75 | 107 | 83 | 31 | 53 |
| 58 | Diphenyl ester of thiodipropionic acid | 1.76 | 107 | 84 | 38 | |

[1] Example 53. The high value for the amine equivalents in this chain extended polyamide is due to the basic tertiary nitrogen groups introduced by the diphenyl ester.

TABLE 7

66 nylon—analysis of polymer stirred for 15 mins. at 285° C. with mixed phenyl esters of dicarboxylic acids or with a diphenyl ester of a 66 nylon type oligomer

| Example | Ester | Amount, in Equiv. per $10^5$ g. | Analysis R.V. | A.E.G. | C.E.G. |
|---|---|---|---|---|---|
| | None | | 35 | 107 | 40 |
| 59 | Diphenyl adipate and Diphenyl azelate | 53.5 53.5 | 96 | 27 | 48 |
| 60 | Diphenyl ester of decamethylene dicarboxylic acid and Diphenyl ester of terephthalic acid | 53.5 53.5 | 84 | 28 | 50 |
| 61 | Diphenyl ester of bis-ω-carboxyvaleryl hexamethylene diamine. | 107 | 62 | 58 | 37 |

Example 61.—Structural formula of the ester is:

$C_6H_5OCO(CH_2)_4CONH(CH_2)_6NHCO(CH_2)_4COOC_6H_5$

EXAMPLES 62-70

Table 8 shows the viscosity increase obtained using esters of the present invention in admixture with homopolymers other than nylon 66. In some cases the viscosity is shown in terms of I.V. instead of R.V., measured as described hereinbefore.

The R.V. of the control polymer fell quickly with residence time due to hydrolysis. Both the 50 and 65 A.E.G. chip-coated polymers showed immediate increases in R.V. to 68 and 87 R.V. respectively at about 50 secs. but hydrolysis at longer residence times again caused the R.V. to fall.

EXAMPLE 77

A coil polymerizer as described in British patent specification No. 1,042,228 was used to produce 7.25 kg./hr.

TABLE 8

Homopolyamides other than 6.6 stirred at 285° C. with diphenyl esters for 15 mins.

| Example | Polyamide | Diphenyl ester | Amount, equiv. per 10⁶ g. | I.V. (R.V.) | A.E.G. |
|---|---|---|---|---|---|
| 62 | Polyhexamethylene sebacamide | None | | 0.63 | 104 |
|    |                               | Diphenyl sebacate | 104 | 1.18 | 15 |
| 63 | Polyhexamethylene dodecanedioamide | None | | 0.88 | 56 |
|    |                               | Diphenyl decamethylene dicarboxylate | 56 | 1.01 | 12 |
| 64 | }Polydodecamethylene adipamide | None | | 0.86 | 98 |
|    |                               | Diphenyl adipate | 98 | 1.33 | 20 |
| 65 |                               | Diphenyl decamethylene dicarboxylate | 98 | 1.39 | 22 |
| 66 | Polyamide from 70% trans trans isomer of bis (4 amino cyclo hexyl) methane and decamethylene dicarboxylic acid. | None | | 0.59 | 54 |
|    |                               | Diphenyl decamethylene dicarboxylate | 54 | 0.90 | 15 |
| 67 [1] | Polyamide from NN' bis (3 amino-n-propyl) piperazine and adipic acid. | None | | (R.V. 38) | 3,445 |
|    |                               | Diphenyl adipate | 75 | (R.V. 142) | 3,314 |
| 68 | Poly meta xylylene adipamide | None | | 0.78 | 93 |
|    |                               | Diphenyl adipate | 93 | 1.26 | 25 |
| 69 | Polyamide from 2,5 bis (beta amino ethyl) para xylene and sebacic acid. | None | | 0.47 | 144 |
|    |                               | Diphenyl sebacate | 110 | 0.96 | 17 |
| 70 | Polyamino undecanoamide | None | | 0.99 | 53 |
|    |                               | Diphenyl adipate | 53 | 1.13 | 22 |

[1] In Example 67 the presence of basic tertiary nitrogen in the polyamide is shown by the high A.E.G. value both in the original polymer and in the chain extended polymer.

EXAMPLES 71-75

Table 9 shows the viscosity increase obtained using esters of the present invention in admixture with copolyamides.

of 66 nylon polymer of the following analysis, at a melt pool pressure of 760 mm. Hg and pool means residence time of 20 minutes.

R.V.—45.5    A.E.G.—54.5    C.E.G.—65.5

TABLE 9

Co-polyamides stirred at 285° C. for 15 mins. with diphenyl esters

| Example | Copolyamide | Ratio A/B | Diphenyl ester | Amount, Equiv. per 10⁶ g. | I.V. (R.V.) | Amine |
|---|---|---|---|---|---|---|
| 71 | Hexamethylene diammonium adipate (A) co-polymerized with caprolactam (B). | 75/25 | None | | (R.V. 37) | 99 |
|    |                                                                            | 75/25 | Diphenyl adipate | 99 | (R.V. 76) | 28 |
| 72 | 66/6 | 86/14 | None | | (R.V. 65) | 47 |
|    |      | 86/14 | Diphenyl adipate | 47 | (R.V. 77) | 22 |
| 73 | Dodecamethylene diammonium (A) and hexamethylene diammonium (B) terephthalates copolymerized. | 75/25 | None | | 0.71 | 53 |
|    |                                                                            | 75/25 | Diphenyl terephthalate | 53 | 0.90 | 7 |
| 74 | Hexamethylene (A) and metaxylylene (B) diammonium adipates copolymerized. | 50/50 | None | | 0.91 | 86 |
|    |                                                                            | 50/50 | Diphenyl adipate | 86 | 1.15 | 26 |
| 75 | {Hexamethylene diamine (A) and N-(2 amino ethyl)-piperazine (B). {Neutralized with adipic acid and copolymerized | 85/15 | None | | 0.62 | 658 |
|    |                                                                            | 85/15 | Diphenyl adipate | 100 | 0.82 | 563 |

NOTE.—Example 75—see footnote 1 for Example 67 (Table 8).

EXAMPLE 76

Polymer chip with the following properties

R.V.—45.0    A.E.G.—49.0    C.E.G.—75 was dried in an oven and charged to the hopper of a screw extruder. The throughput through the extruder was varied between 1.0 and 11.5 lb./hr. and after allowing conditions to equilibrate at each throughput, the extrudate was quenched in water and analyzed. A plot of R.V. against residence time is given in FIG. 1 (X). The residence times were estimated at each throughput by using colored polymers as tracers.

Diphenyl adipate was then coated onto the dried chip at a loading of 49 gram equivalents DPA per/10⁶ gm. polymer and the above experiment was repeated. The results are also shown in FIG. 1 (Y).

In order to investigate the affect of increased A.E.G. level on the rate of R.V. rise, a polymer of 45 R.V., 65 A.E.G and 62 C.E.G. was dried and coated with 65 gm. equivs./10⁶ gm. of diphenyl adipate. The above experiment was again repeated and the results are also shown in FIG. 1 (Z).

When the melt pool pressure was reduced to 620 mm. absolute, the extruded yarn possessed the following properties.

R.V.—49.1    A.E.G.—51.5    C.E.G.—59.6

An injection point was now fitted to the polymerization coil at a point 1.5 meters from the melt pool, the time for polymer to flow from this point to the pool was 100 seconds. Dicresyl adipate was added at this point at a rate of 60 g./hr. The melt pool pressure was 620 mm. and the polymer throughout was 7,250 g./hr. The resulting polymer possessed the following properties:

R.V.—63.7    A.E.G.—36.4    C.E.G.—63

EXAMPLE 78

A 6.6 nylon polymer prepared by normal autoclave polymerization techniques possessed the following properties R.V.—45.3    A.E.G.—66.4    C.E.G.—50
Copper 60 p.p.m. (acetate)    Iodine—600 p.p.m.
Boron—22 p.p.m.

45.4 kg. of this polymer was tumble-mixed in a Gardner mixer with 474 g. of diphenyl adipate for 2 hours at 25° C. The resulting mixture was spun under a steam atmosphere on a screw fed melter at a rate of 15.9 kg./hr. with a melt residence time of approx. 4.5 minutes to give a 140 filament, 4100 denier yarn when wound up at 956 f.p.m. This yarn was stored for 6 hours at 25° C. and 75% R.H. before drawing at 1115 f.p.m. at a draw ratio of 5.38 to give an 840 denier yarn having 0.35 t.p.i. Z twist.

The physical properties of this yarn were:

Tenacity—9.3 g.p.d.   Extension—13.5%   TE½—34
R.V.—78   A.E.G.—23.5   C.E.G.—68

The yarn was converted by conventional methods into greige cord construction two-fold 840/140 12Z/12S having a breaking load of 14.8 kg. When this cord was further processed using the conventional resorcinol-formaldehyde latex (R.F.L.) adhesive process, the breaking load of the dip dried hot stretched cord was 14.3 kg.

Cords produced by similar processes from polymer of analysis:

R.V.—46   A.E.G.—51   C.E.G.—70   Copper—66
p.p.m. (acetate)   Iodine—600 p.p.m.

giving yarn with properties:

Tenacity—8.8   Extension—13.5   TE½—31 without admixture of diphenyl adipate, possessed the following properties:

|  | Kg. |
|---|---|
| Greige cord breaking load | 13.0 |
| R.F.L. dip dried hot stretched cord breaking load | 12.8 |

EXAMPLE 79

The molecular weight distributions of two yarns were studied by coacervate extraction fractionation in phenol/water at 70° C., J. Polymer Sci., 1962, 57, 357–372. Tire cord was used as a control for the other two yarns which were spun from tire cord polymers chip mixed with diphenyl adipate (DPA) powder to increase the spun yarn R.V. via chain extension (see Table 10).

Molecular weight distributions calculated from the fractionation data are shown in the form of Tung's analysis (J. Polymer Sci., 1956, 20, 495) in FIG. 2, which presents the experimental data in a linear form. The slope of the Tung analysis line $b$ depends on the actual form of the molecular weight distribution and a value of $b=1.89$ has been found for undegraded linear 6.6 nylon polymers of R.V. 20–90. For the tire cord and 85 R.V. yarn, experimental data was in excellent agreement with a slope of $b=1.89$; the Tung analysis of the higher R.V. yarn, although less well defined, still being in reasonable agreement with a line of the same slope.

The intercept $a$ of Tung's analysis ($b=1.89$) is determined by the polymer molecular weight MW and the molecular weights calculated in this manner are shown in Table 10.

The conclusion drawn from this work is that the yarn of high R.V. obtained via chain extension with DPA has essentially the same form of molecular weight distribution as the control T.C. yarn, but is of higher molecular weight. The conclusion is in agreement with theory which predicts that chain extension in 6.6 nylon takes place with no alteration in the shape of the molecular weight distribution.

What we claim is:

1. A process for the production of a melt-spun fiber or filament from a synthetic linear melt-spinnable polyamide or copolyamide made from dicarboxylic acid and diamine component and including free amine end groups obtained from said diamine component, said process comprising adding to and reacting with the synthetic linear polyamide or copolyamide in the molten state at least one diaryl ester of a dicarboxylic acid with a state amounts substantially stoichiometrically equivalent to the free amine end groups in said polyamide or copolyamide of number of 5 to 36 and having the carboxyl groups attached either to a single carbon atom, provided the other bonds of said carbon atom are connected to saturated aliphatic groups or form part of a saturated alicyclic structure, or attached to separate carbon atoms other than vicinal- or peri-positioned carbon atoms; the aryl of said ester being monocyclic or dicyclic and said ester being added in a substantially stoichiometric amount with respect to said free amine end groups in said polyamide or copolyamide so as to increase the relative viscosity thereof by increasing the polymer chain length, and then melt-spinning the resulting melt into fiber or filament.

2. The process as claimed in claim 1 wherein said dicarboxylic acid of said ester is an aliphatic, cycloaliphatic, aromatic hydrocarbon or heterocyclic acid.

3. The process as claimed in claim 1 wherein said polyamide is polyhexamethylene adipamide.

4. The process as claimed in claim 1 wherein said diaryl ester is a diphenyl ester.

5. The process as claimed in claim 1 wherein said diaryl ester is a dicresyl ester.

6. The process as claimed in claim 1 wherein said diaryl ester is diphenyl adipate.

7. The process as claimed in claim 1 wherein said diaryl ester is dicresyl adipate.

8. The process as claimed in claim 1 wherein the time between adding the aryl ester to the melt and the solidification of the subsequently melt-spun product is such as to give substantially the optimum rise in relative viscosity of the spun product.

9. The process as claimed in claim 1 wherein said ester is coated onto said synthetic linear polyamide or copolyamide chip.

10. The process as claimed in claim 1 wherein said ester is added to said synthetic linear polyamide or copolyamide in the form of a master batch.

11. The process as claimed in claim 1 wherein said ester is added to a synthetic linear polyamide or copolyamide made in a continuous polymerization process.

(References on following page)

TABLE 10
Fractionation of T.C. and chain extended tire cord yarns

| DPA, μeq./g. | Yarn | | | Tung analysis | | | |
|---|---|---|---|---|---|---|---|
| | Identity in FIG. 2 | R.V. | MW from R.V. | $b$ | $a$, $\times 10^{-5}$ | MW | R.V. from MW |
| Nil | | 46 | 33,500 | 1.89 | 1.86 | 33,200 | 46 |
| 70 | | 85 | 46,000 | 1.89 | 1.12 | 43,500 | 76 |

References Cited

UNITED STATES PATENTS

| | | | |
|---|---|---|---|
| 2,557,808 | 6/1951 | Walker | 260—78 SC |
| 2,705,227 | 3/1955 | Stamatoff | 260—78 SC |
| 3,363,027 | 1/1968 | Schnegg et al. | 260—78 SC |
| 3,378,532 | 4/1968 | Fritz et al. | 260—78 SC |

HAROLD D. ANDERSON, Primary Examiner

U.S. Cl. X.R.

57—140 R; 161—227; 260—18 N, 47 CZ, 78 A, 857 PE; 264—176 F